United States Patent [19]
Larsson et al.

[11] Patent Number: 6,104,489
[45] Date of Patent: Aug. 15, 2000

[54] ARRANGEMENT RELATING TO BEAM EMISSION

[75] Inventors: Johan Michael Larsson, Göteborg; Kennet Jan-Ake Vilhelmsson, Partille; Sverker Hård af Segerstad, Göteborg, all of Sweden

[73] Assignee: Radians Innova AB, Gothenburg, Sweden

[21] Appl. No.: 09/155,664

[22] PCT Filed: Apr. 1, 1997

[86] PCT No.: PCT/SE97/00562

§ 371 Date: Oct. 1, 1998

§ 102(e) Date: Oct. 1, 1998

[87] PCT Pub. No.: WO97/37265

PCT Pub. Date: Oct. 9, 1997

[30] Foreign Application Priority Data

Jan. 4, 1996 [SE] Sweden .................................. 9601252

[51] Int. Cl.[7] ..................................................... G01N 15/02
[52] U.S. Cl. ............................................. 356/335; 356/343

[58] Field of Search ................................... 356/335, 336, 356/338, 343; 359/558, 559, 335

[56] References Cited

U.S. PATENT DOCUMENTS 5,610,712   3/1997   Schmitz et al. .......................... 356/335

Primary Examiner—Frank G. Font
Assistant Examiner—Tu T. Nguyen
Attorney, Agent, or Firm—Standley & Gilcrest LLP

[57] ABSTRACT

Arrangement for generating well-defined beam distribution over a surface or in a volume by means of a diffraction optical element (17). The arrangement includes at least one laser source (14), an optical filter means, preferably a mode-selective filter (16), a diffraction optical component (17) as well as possible coupling and focusing elements (15, 18). Said components, means and elements are positioned and fixed in a common unit and that the filter (16) is so developed that the beam from the source (14) after passage through said mode-selective filter (16) occurs essentially in one mode.

38 Claims, 1 Drawing Sheet

ARRANGEMENT RELATING TO BEAM EMISSION

TECHNICAL FIELD

The invention relates to an arrangement for generating well-defined beam distribution over a surface or in a volume by means of a diffraction optical element.

BACKGROUND

As is well known, the space and time coherency of radiation from lasers is much higher than those of "normal", thermal radiation sources (such as ordinary light bulbs). These characteristics of a laser beam are much valuable and have meant that optical technics during later years have found new applications important for the society, for instance through the CD-technique. Within the visible region of the electromagnetic spectra, in particular gas lasers, for instance the well-known HeNe and argon-ion lasers, exhibit very good space coherency, and the beam width from these lasers has rotation symmetrically Gaussian distribution, the wave fronts are uniform (plane or spherical) and free from astigmatism. Such a well-defined beam characteristics are for instance very valuable when gas lasers are used together with diffraction optical elements (DOE), for example kinoforms. For ideal operation, the beam which incides towards the kinoform must be well-defined and known.

Another laser type is a semiconductor laser (or a diode laser), which is very interesting due to its small size, its ability to modulate, its low power consumption and its long life. It is used in several applications where these characteristics are required. However, there are many applications where one wants to use diode lasers where today gas lasers are used. The reason that one does not changes to a diode laser is the poor beam quality, ellipticity at astigmatism and indefinite intensity distribution across the beam of the diode lasers. In many cases, the diode laser is ideal for use in connection with diffraction optical components. This specially applies to its smallness, which makes it possible to combine DOE and diode laser in small and compact units. However, the beam quality of the diode lasers is not ideal for being used together with DOE. The present invention ensures an ideal function of diode laser, first by improving the beam quality and then the beam may illuminate the diffraction optical component.

The conformity between the beam which actually leaves the kinoform and the beam which at design time of the kinoform is assumed to leave it, depends on how well the beam onto the kinoform conforms with the one which is assumed to incide the kinoform through its design. A well-defined beam, which incides the kinoform is consequently a requirement for a well-defined outgoing beam and thereby a basic important requirement to obtain high beam quality out from the kinoform. One example of a diffraction optical element which requires illumination with very high beam quality is a kinoform formed for beam shaping purposes. A kinoform consists of a translucent plate, preferably of plastic or glass. The light phase that passes the plate varies over its cross-section in a way that it is precalculated in a computer. The phase agitation is carried out by means of corresponding variations in the refractive index of the plate or by applying one side of the plate with a shallow, about 1 $\mu$m thick surface relief. The kinoform uses the light up to 90%, which is important in a case where the light effect is moderate, for example some mW. In an ordinary production method a relief original is produced by means of an electronic beam or laser lithography, after which a first "master" of metal is manufactured. The latter is used to "stamp" the relief onto the relief carrier.

There are many ways to improve the quality of a laser beam, for instance through different types of filtration, for example focusing through a small aperture (1–100 $\mu$m) or by means of a singlemode fibre. Depending on the quality of the laser beam, different degrees of filtration can be needed. Gas lasers, as mentioned earlier, have a high beam quality, however not ideal. There is always a small amount of scattered light. There is a need for a certain filtration to ensure the quality, also from a gas laser, for example by means of a small aperture. Diode lasers have much worse beam quality, which requires higher filtration, for example by means of a singlemode fibre.

The advantage of using a singlemode fibre is that one probably knows the out coming beam, which is well-defined mathematically.

Through a filter arrangement the kinoform can be illuminated with a known mathematically simple descriptive beam. A well-defined beam with a filter has also the advantage of simplifying computations when designing, the kinoform and eliminates need to measure the incide beam before the design of the kinoform. With "a well-defined beam" is meant that the beam has substantially Gaussian rotation symmetrical intensity cross-section. where the wave front is plane or spherical.

THE OBJECT OF THE INVENTION AND ITS CHARACTERISTIC

That main object of the present invention is to provide an arrangement for generation of laser beam having a desirable spatial distribution over a surface or in a volume. The beam emanates from a laser, which itself gives an insufficient beam quality for illumination of the diffraction optical component.

It is not an insignificant problem to provide an arrangement for assembly of diode laser, beam enhancer and a diffraction optical component of for example the beam shaping kinoform type. A necessary assumption is that the mentioned components, which correspond to the basic functions, are integrated in a stable unit. At the same time that the device must be stable, its dimensions must be held small so that the entire device in turn is suitable for integrationist in an application system, which operates reliably and continuously during long periods.

The invention is for instance intended for applications for measurement technique. With the device according to the invention one can generate patterns, for example in form of a cross, brace or rings, suitable for pointing devices, for example at workshop assemblies or construction work. Similar needs for pointing devices may be found in medical diagnostics. For direct measurement of a curved object one can produce an image of it with one or more illumination lines generated by the device and study the line's projection in the reproduction plane.

The device can also create an illumination rectangle with a more uniform intensity distribution This can be used for all sorts of measurement, for example according to the shadow method.

One can also project very complicated patterns using the device, for example logotypes and trademarks.

To be usable in many applications, for example to provide a cross-section distribution of the generated beam of "top hat" type, the components are aligned in the device and fixed essentially permanently with very high precision. The assembly precision in lateral direction should be within 2–5 μm, but also longitudinal direction and rotation, i.e. in orientation of a component, high precision is required. The significant assembly precision to obtain maximum intensity is required in the beam emitting from the device, to obtain an ideal filtration function, to obtain desired beam distribution by illumination of the diffraction optical component and that the latter should be correctly placed in a determined position in the illumination cone.

Other applications, such as pattern generation with kinoform, do not require alignment and positioning of the components in the precalculated positions in the device.

To superintend that harmful reflexes and scatter beams are eliminated in the device, is as important as satisfying the stability and uniform alignment requirements. Achieving these is not possible, if the different functions of the device are located in separate units. In an integrated unit, however this can be achieved by tilting or bevelling the reflective surfaces in respect of the beam path in the device, as well as uniting components via a refractive index fitting medium, for example an optical cement.

Essential for the invention is that the components that perform the operations of beam generation, beam quality improvement and beam distribution, are integrated and coordinated in a common stable unit. This is a requirement to be able to align critical components and permanently fix them in the precalculated positions and substantially to reduce the optical interferences through reflexes and scattered beam.

In an embodiment of the arrangement for generating well-defined beam distribution over a surface or in a volume by means of a diffraction optical element, the arrangement includes at least a laser source, an optical filter, preferably a mode-selective filter and a diffraction optical component as well as possible connection and focusing element, whereby said components, means and elements are arranged and fixed in a common unit and that the filter is so formed that the beam from the source after passage through said mode-selective filter occurs substantially in one mode.

In an embodiment the laser source consists of a laser diode, the mode-selective filter is an optical singlemode fibre and the diffraction optical element a kinoform.

In many cases, the diffraction optical element generally must be placed in a predetermined position in a radiation mode and in a predetermined orientation, so that a surface relief is perpendicular to the axis of the beam mode. The required lateral and angular precession is directly related to the size of the laser beam when it encounters the diffraction optical element. The dependency of the positioning on temperature variations must be reduced.

In an embodiment, the diffraction optical element and the focusing element are arranged in a diffraction optical element and/or the end surfaces of the fibres are bevelled.

In an advantageous embodiment the device comprises a casing including at least one laser source, a coupling means, forming a coupling lens arranged between the laser source and a mode-selective filter and a diffraction optical component arranged between the mode-selective filter and a focusing element. Components, means and elements are positioned and fixed in a common unit and the mode-selective filter is so arranged that a beam from the source, after passage through said mode-selective filter occurs essentially in one mode.

In yet another advantageous embodiment, the diffraction optical element with its carrier is index matched to the mode-selective filter and the end surfaces of the fibres are bevelled.

BRIEF DESCRIPTION OF THE DRAWINGS

The invention will be described with reference to an embodiment shown on enclosed drawings, in which.

DESCRIPTION OF THE EMBODIMENT

Figure 1:
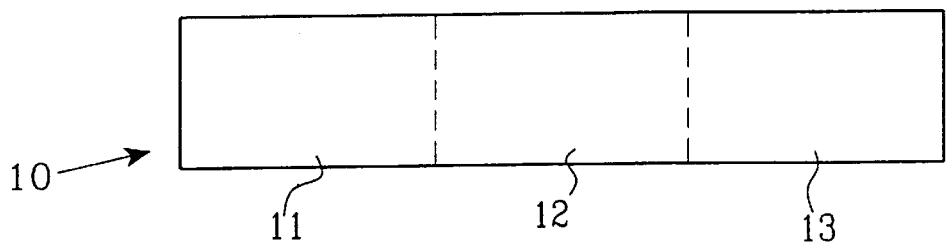
FIG. 1 shows a block diagram of an embodiment according to the present invention.

FIG. 1 shows a block diagram of a device, which generates a laser beam with a desirable spatial dispensation according to the present invention. The device 10 has three main parts: a laser source 11, an optical filter 12, substantially a mode-selective filter and a phase affecting unit 13. The laser source 11 generates the primary beam, the mode-selective filter 12 selects a beam mode in the primary generated beam and the phase affecting units 13 decides the phase distribution in a cross-section of the beam that leaves the diffraction optical component.

The filtering device may consist of a number of components, which allow larger portion of the laser diode power passe the filter than a simpler filter with one component. In such an arrangement, for example prisms, lenses or kinoforms may be included in different forms and combinations. Without such a combination of components the power portion, which passes the filter is typical about 25–30%. It is improved substantially by using a group of components.

Connected to or close to the diffraction optical component, there is a focusing or collimating element, usually a lens, which can be positioned between the filtering device and the diffraction optical plate or in the beam path after the plate. Moreover, the diffraction optical function can be integrated in the lens by a relief layer on one surface of the lens. Another alternative is that one through design calculation of a kinoform obtains the focusing characteristics.

Figure 2:
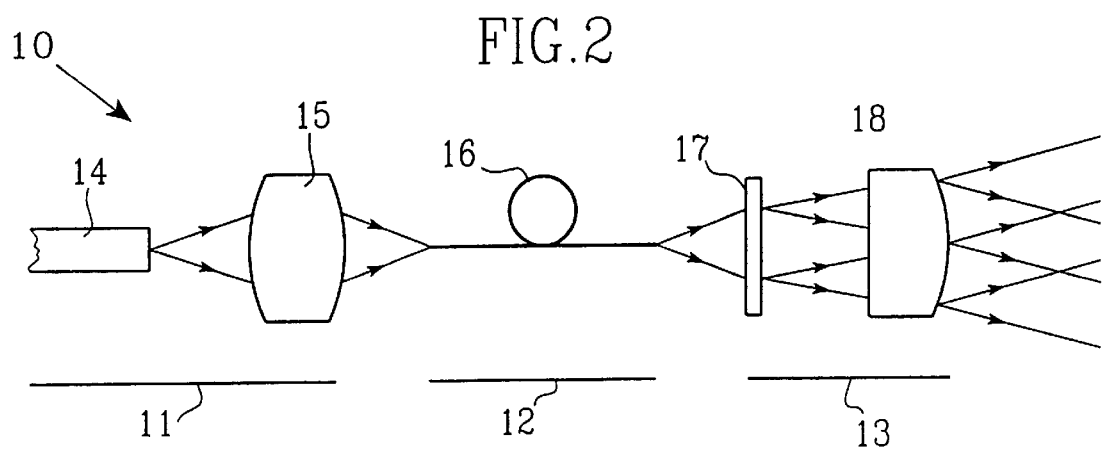
FIG. 2 shows schematically and in more detail the embodiment according to FIG. 1.

In the schematic embodiment according to FIG. 2, the laser source 11 includes at least one laser diode 14, preferably of conventional type and at least one coupling means 15, for example a coupling lens. The mode-selective filter 12 includes a light filter, which in this embodiment consists of at least one optical fibre 16. The phase affecting unit 13 includes at least a kinoform 17 and a focusing, filter 18.

The quality enhancement according to this embodiment is achieved by means of the coupling lens 15 focusing the beam (shown with arrows) emitted from the laser diode 14 into the optical fibre 16. which preferably is of singlemode type. After that the beam has travelled an appropriate distance in the fibre, a perfect beam is obtained out coming from the fibre, which is free from ellipticity and astigmatism, as the fibre 16 itself has a selected radiation mode. Reflexes from the fibre end closest to the can lens could easily reach the laser diode via the lens and cause oscillations in the beam radiation. To prevent this, the fibre end surface is bevelled and a plane parallel glass plate (not shown) is index matched to this.

That beam cluster diverged from the fibre continues through the kinoform 17. which is arranged across the beam. In this embodiment, the kinoform is a relief, which is arranged on the far end surface of a plane-parallel glass plate, seen from the fibre. The relief is calculated and manufactured with adaptation to the beam divergency from the fibre and the cross-section size of the beam at the kinoform so that a correct phase distribution is added to the beam from the fibre. The laser beam after passage through the fibre and kinoform receives the intensity and phase distribution, which after reshaping through diffraction and focusing gives the predetermined beam distribution. Also, att the entrance side the reflexes, which could reach the diode laser from the fibres exit surface, are reduced by bevelling the fibre end and by index fitting the glass plate carrying the kinoform to the fibre.

Figure 3:
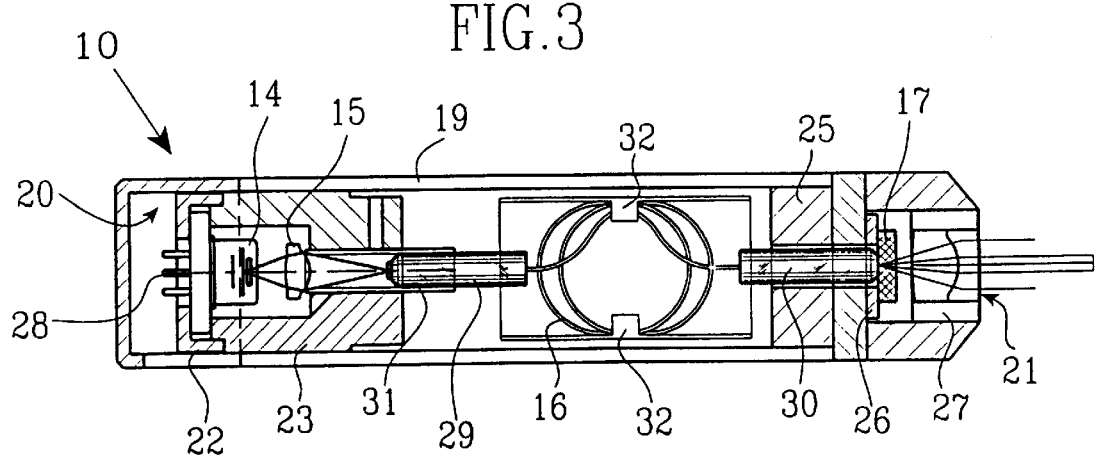
FIG. 3 is drawing showing an embodiment of a preferred unit.

FIG. 3 shows an embodiment of the device according to the invention. The device 10 includes a casing 19 provided with a connection end 20 and a beaming end 21. A cooling body 22 is provided to increase the heat transportation from the laser diode 14. The casing 19 includes additional holders 23–27, which support the enclosed components, i.e. the holder 23 supports the coupling lens 15, the holder 24 supports the fibre 16, the holder 26 supports the kinoform 17 and the holder 27 supports the focusing lens 18. The contact electrodes 28 are used to operate the diode laser 14.

The fibre 16 is at each end equipped with plugs 29 and 30, respectively, so-called fibre ferrules. The receiving portion 23 is equipped with a part 31 extending from it, for receiving ferrule 29 and positioning the same relative the lens 15. The other ferrule 30 is positioned by the holder 25. Furthermore, the holder 24 supporting the fibre 16 includes holder 32 which holds the fibre in its place.

The contact electrodes 28 can be connected to an energy source that provides the laser diode 14 with energy. In one embodiment an energy source can for example be a battery which is arranged within the casing. At least one end of the casing is arranged detachable for simpler assembly and maintenance.

The kinoform with the carrier 26 must be positioned laterally and angularly with a precession which is directly related to the size of the laser beam when it encounters the kinoform. The position must be independent of temperature variations.

While we have illustrated and described only one preferred embodiment of the invention, it is obvious that several variations and modifications within the scope of the enclosed claims may occur.

DESIGNATION NUMERAL

10 Device
11 Laser source
12 Mode-selective filter
13 Phase affecting unit
14 Diode laser
15 Coupling means
16 Optical fibre/filter
17 Kinoform
18 Focusing lens
19 Casing
20,21 End
22 Cooling body
23–27 Holder
28 Contact electrodes
29,30 Fibre ferrules
31 Holder
32 Holder

What is claimed is:

1. Arrangement for generating well-defined beam distribution over a surface or in a volume by means of a diffraction optical element, including at least one laser source, a mode-selective optical filter in communication with said laser source, a diffraction optical component in communication with said mode-selective optical filter, said diffraction optical component adapted to select the phase distribution of a beam passing through said diffraction optical component, and a plurality of coupling and focusing elements placed in the paths of said selected beams such that sufficient coherence of each said selected beams is maintained.

2. An arrangement according to claim 1, characterised in, that the laser source comprises a diode laser.

3. An arrangement according to claim 1 characterised in, that the mode-selective optical filter comprises an optical singlemode fiber.

4. An arrangement according to claim 3 further comprising a plane-parallel glass plate index fitted to said optical singlemode fiber.

5. An arrangement according to claim 1, characterised in, that the diffraction optical component comprises a kinoform.

6. An arrangement according to claim 1, characterised in, that the diffraction optical component is placed in a predetermined position in one radiation mode.

7. An arrangement according to claim 6, characterised in, that the diffraction optical component is positioned in a predetermined orientation so that the diffraction optical component is perpendicular to an axis of the radiation mode.

8. An arrangement according to claim 1, characterised in, that the diffraction optical component and the focusing element are formed in a diffraction optical component.

9. An arrangement according to claim 3, characterised in, that the singlemode end surfaces of the optical singlemode fiber are bevelled.

10. An arrangement according to claim 1, characterised in, that the diffraction optical component is positioned laterally and angularly with a precession that is directly related to the laser beam when size it encounters the diffraction optical component.

11. An arrangement according to claim 10, characterised in, that the position is independent of temperature variations.

12. A device for generating well-defined beam distribution over a surface or in a volume by means of a diffraction optical element, including:
at least one laser source, a coupling lens in communication with said laser source, a mode-selective optical filter in communication with said coupling lens, and a diffraction optical component in communication with said mode-selective optical filter, said diffraction optical component adapted to select the phase distribution of a beam passing through the diffraction optical element, and a focusing element in communication with said diffraction optical component.

13. The device according to claim 12, characterised in, that the diffraction optical component with its carrier is index fitted to the mode-selective optical filter.

14. The device according to claim 13, characterised in, that the end surfaces of the optical singlemode fibers are beveled.

15. An optical device for generating a well-defined beam distribution, said optical device comprising:
(a) a coherent light source,
(b) a mode-selective optical filter,
(c) a first index-matching uniting component connecting said coherent light source to said mode-selective optical filter, said first index-matching uniting component aligned such that a beam from said coherent light source enters said mode-selective optical filter sufficiently along the longitudinal axis of said mode-selective optical filter, (d) a diffraction optical component, and (e) a second index-matching uniting component connecting said optical filter to said diffraction optical component, said second index-matching uniting component aligned such that a beam exiting said optical filter is incident upon said diffraction optical component.

16. An optical device according to claim 15 additionally comprising focusing lenses placed in the path of said beam.

17. An optical device according to claim 15 wherein said mode-selective optical filter is selected from the group consisting of optical fibers and lens systems.

18. An optical device according to claim 15 wherein said mode-selective optical filter comprises a single-mode optical fiber.

19. An optical device according to claim 18 wherein the ends of said optical fiber are beveled.

20. An optical device according to claim 15 wherein the optical components of said optical device are united by a refractive index-fitting medium.

21. An optical device according to claim 20 wherein said refractive index-fitting medium is optical cement.

22. An optical device according to claim 15 additionally comprising secondary mode-selective optical filters in connection with said mode-selective optical filter, whereby the power of the light beam incident upon said refraction device is increased.

23. An optical device according to claim 15 additionally comprising index-matched transparent plates connected to the ends of said mode-selective optical filter.

24. An optical device according to claim 15 wherein said diffraction optical component generates multiple illumination lines.

25. An optical device according to claim 15 wherein said diffraction optical component generates a predetermined optical pattern.

26. An optical device according to claim 15 additionally comprising a cooling device in connection with said coherent light source.

27. An optical device for generating a well-defined beam distribution, said optical device comprising:

(a) a plurality of coherent light sources, (b) at least one mode-selective optical filter, (c) a first index-matching uniting component connecting each of said coherent light sources to said optical filter, said first index-matching uniting components aligned such that a beam from each of said coherent light sources enters said optical filter sufficiently along the longitudinal axis of said optical filter, (d) at least one diffraction optical component, and (e) a second index-matching uniting component connecting each said diffraction optical component to said mode-selective optical filter, said second index-matching uniting components aligned such that each beam exiting said mode-selective optical filter is incident upon a said diffraction optical component.

28. An optical device according to claim 27 additionally comprising focusing lenses placed in the path of each said beam.

29. An optical device according to claim 27 wherein said mode-selective optical filter is selected from the group consisting of optical fibers and lens systems.

30. An optical device according to claim 27 wherein said mode-selective optical filter comprises a single-mode optical fiber.

31. An optical device according to claim 30 wherein the ends of said optical fiber are beveled.

32. An optical device according to claim 27 wherein the optical components of said optical device are united by a refractive index-fitting medium.

33. An optical device according to claim 32 wherein said refractive index-fitting medium is optical cement.

34. An optical device according to claim 27 additionally comprising secondary mode-selective optical filters in connection with said mode-selective optical filter, whereby the power of the light beam incident upon said refraction device is increased.

35. An optical device according to claim 27 additionally comprising index-matched transparent plates connected to the ends of said mode-selective optical filter.

36. An optical device according to claim 27 wherein said diffraction filter generates multiple illumination lines.

37. An optical device according to claim 27 wherein said diffraction filter generates a predetermined optical pattern.

38. An optical device according to claim 27 additionally comprising a cooling device in connection with said coherent light source.

* * * * *